United States Patent [19]

Okutsu

[11] Patent Number: 4,996,614
[45] Date of Patent: Feb. 26, 1991

[54] MAGNETIC RECORDING APPARATUS HAVING DUST REMOVING SURFACE FEATURE

[75] Inventor: Naohiro Okutsu, Kanagawa, Japan

[73] Assignee: Mitsubishi Denki Kabushiki Kaisha, Tokyo, Japan

[21] Appl. No.: 447,562

[22] Filed: Dec. 7, 1989

[30] Foreign Application Priority Data

Dec. 8, 1988 [JP] Japan ................................ 63-310656

[51] Int. Cl.$^5$ ................................................ G11B 5/60
[52] U.S. Cl. ..................................................... 360/103
[58] Field of Search .................................. 360/102–104

[56] References Cited

U.S. PATENT DOCUMENTS 4,939,603  7/1990  Inumochi ............................ 360/103

FOREIGN PATENT DOCUMENTS 61-246976  11/1986  Japan .................................. 360/103
63-113989   5/1988  Japan .................................. 360/103

Primary Examiner—A. J. Heinz
Attorney, Agent, or Firm—Wolf, Greenfield & Sacks

[57] ABSTRACT

A magnetic head is provided at its front end with respect to the surface of a magnetic disk with a stepped portion to cause a vortex of air stream so as to take dust away from the disk surface.

19 Claims, 3 Drawing Sheets

MAGNETIC RECORDING APPARATUS HAVING DUST REMOVING SURFACE FEATURE

BACKGROUND OF THE INVENTION

1. Field of the Invention

This invention relates to a magnetic recording apparatus for recording and reproducing data with a magnetic disk.

2. Description of the Prior Art

A prior art magnetic recording reproducing apparatus will now be described with reference to FIGS. 7 and 8. Referring to the figure, reference numeral 1 designates a magnetic disk rotatable by drive means (not shown), and 2 a magnetic head supported by suspension 3 and located over magnetic disk 1. Magnetic head 2 comprises head section 2a, to which electrical current is provided from a control unit (not shown), slider section 2b in contact with magnetic disk 1 and taper section 2c at the free end of slider section 2b.

In operation, magnetic head 2 is held urged against magnetic disk 1 by spring force F of suspension 3. While disk 1 is stationary, slider section 2b is held in contact therewith by spring force F. When disk 1 is rotated, head 2 acquires floating force H owing to air stream A generated with the rotation, and disk 1 is held floated with a slight gap with respect to disk 1 with equilibrium between floating force H and spring force F. In this state, head 2 performs recording or reproduction of data on or from disk 1 according to a signal from the control unit.

With the above prior art magnetic recording apparatus, however, during high speed rotation of the magnetic disk the slider section of the head and disk are in contact with each other, and dust is generated from the disk surface. Dust thus generated remains in the vicinity of the disk surface and enters again into the gap between the slider section and disk, thus giving rise to a head crush or damage to the disk.

SUMMARY OF THE INVENTION

This invention seeks to solve the above problem, and its object is to provide a magnetic recording apparatus, in which generated dust is separated as much as possible from the surface of the magnetic disk to minimize dust entering the gap between the head slider section and disk so as to eliminate or reduce the head crush.

According to the invention, there is provided a magnetic recording apparatus, which comprises a magnetic head located above a magnetic disk and floated from the same by an air stream generated by the rotation of the disk, and in which the head is provided on its front end portion with a laterally extending stepped portion facing the disk surface.

The above and other objects, features and advantages of the invention will become more apparent from the following description when taken in conjunction with the accompanying drawings.

DETAILED DESCRIPTION OF THE PREFERRED EMBODIMENTS

Figure 1:
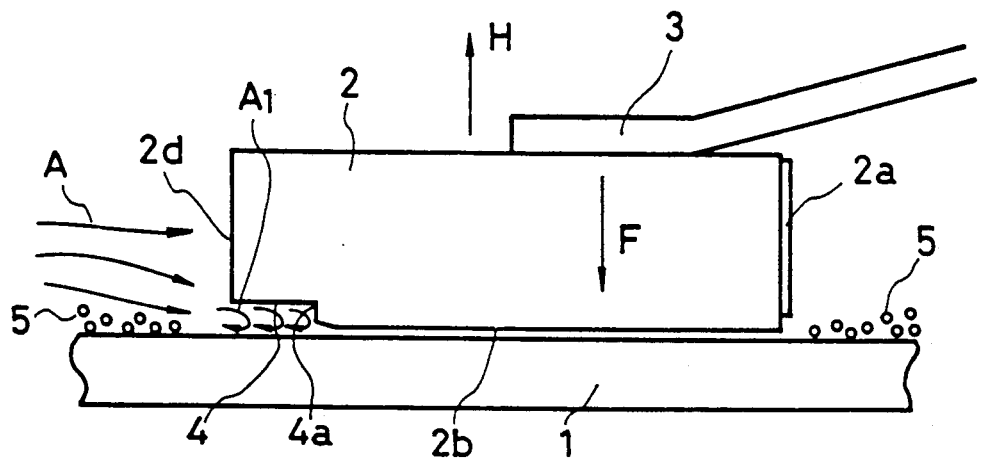
FIG. 1 is a side view showing an embodiment of the magnetic recording apparatus according to the invention.
Figure 2:
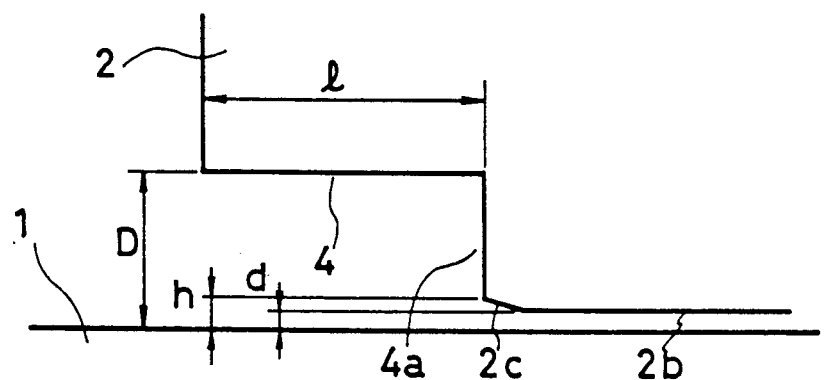
FIG. 2 is a fragmentary side view of the magnetic head according to the invention.
Figure 3:
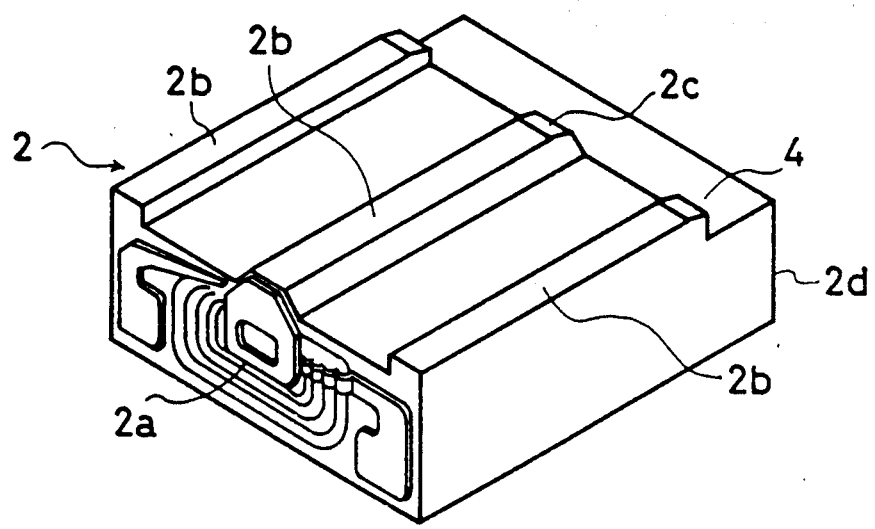
FIG. 3 is a perspective view showing the magnetic head according to the invention.
Figure 7:
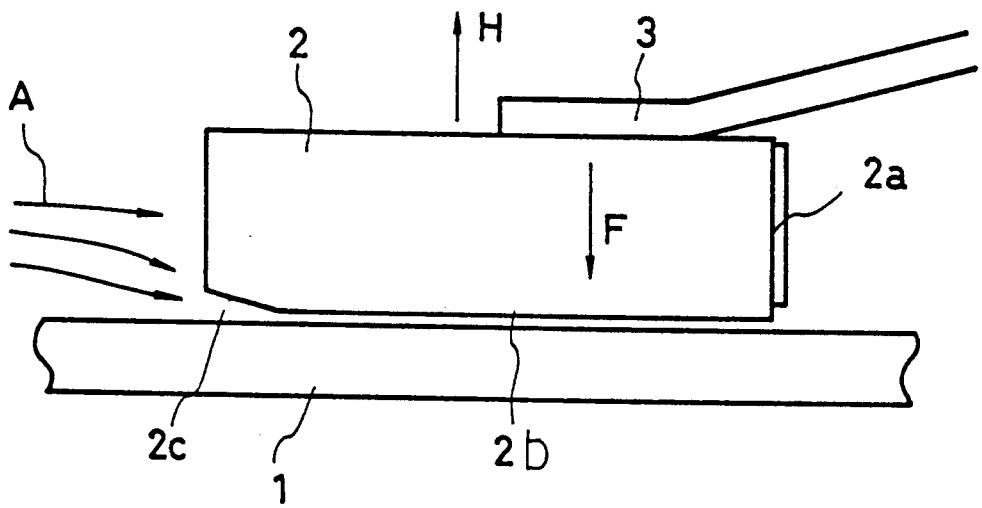
FIG. 7 is a side view showing a prior art magnetic recording apparatus.
Figure 8:
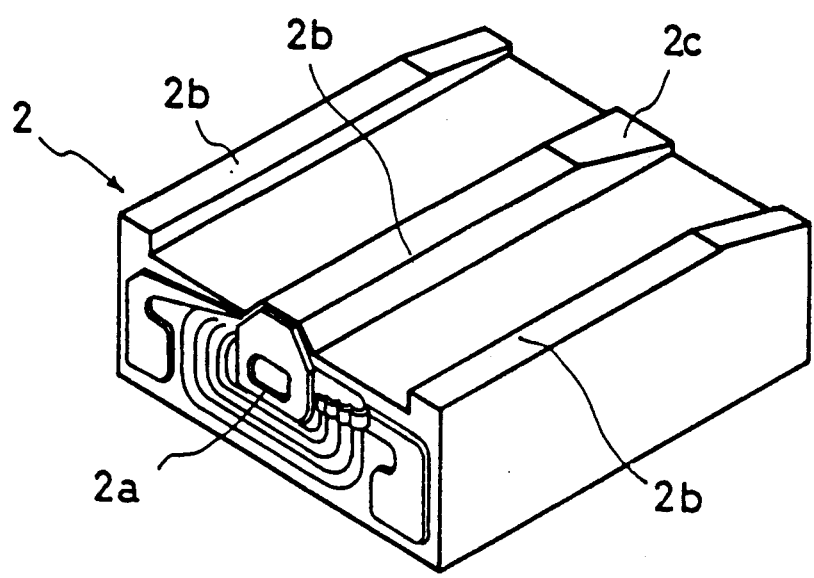
FIG. 8 is a perspective view showing a prior art magnetic head.

One embodiment of the invention will now be described with reference to FIGS. 1 to 3. Parts like those in FIGS. 7 and 8 are designated by like reference numerals, and their description is not given. Referring to the figures, reference numeral 4 designates stepped portion having or terminating in end surface 4a extending perpendicular to slider section 2b. Stepped portion 4 extends laterally of magnetic head 2 and terminates in front end 2d of head 2, that is, it is provided on the side, from which air stream A enters the gap between the head and disk. Stepped portion 4 has a height which may be at least ten times the gap between slider section 2b of head 2 and disk 1. The gap d between slider section 2b and head 1 as shown in FIG. 2, is several microns, so the height of stepped portion 4 may be several ten microns. Also, the depth of stepped portion 4 may be several 100 microns. The height of taper section 2c is 5 to 6 microns.

In the above construction, magnetic head 2 is urged against magnetic disk 1 by spring force F of suspension 3, and while disk 1 is stationary, slider section 2b is held in contact therewith by spring force F. When disk 1 is rotated, head 2 acquires floating force H due to air stream A generated with the rotation, and it is held floated with a slight gap from disk 1 determined by equilibrium between floating force H and spring force F. In this state, head 2 records or reproduces data on or from disk 1 according to a signal from the control unit.

Air stream A noted above is formed into vortex flow A1 at the front end of head 2 by stepped portion 4 thereof, thus taking dust 5 away from the surface of disk 1. Consequently, the amount of dust 5 entering the gap between slider section 2b of head 2 and disk 1 is substantially reduced.

Figure 4:
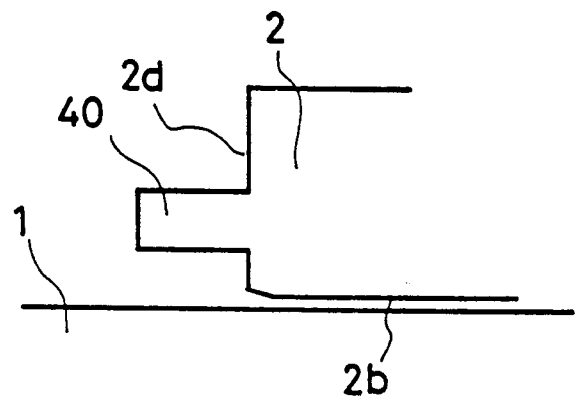
FIG. 4 to 6 are side views showing magnetic heads of different embodiments of the invention.
Figure 5:
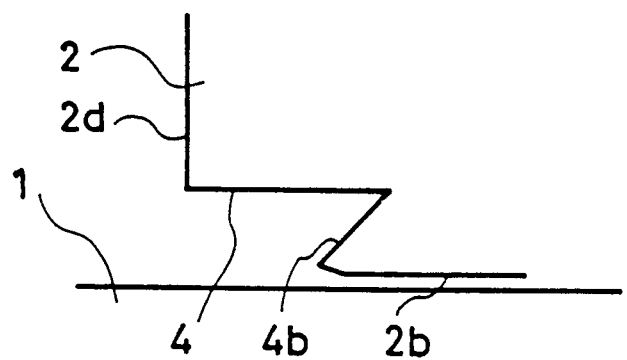
Figure 6:
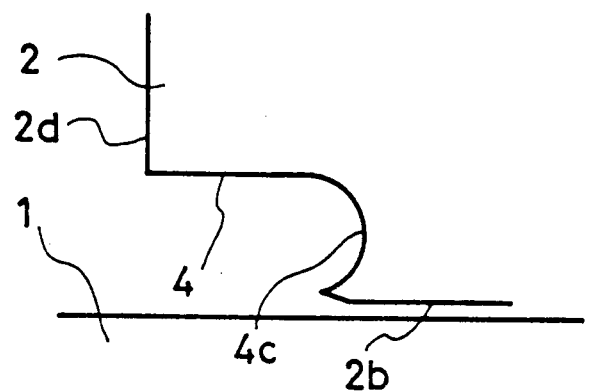

In this embodiment, stepped portion 4 with end surface 4a perpendicular to slider section 2b is provided at front end 2d of magnetic head 2 facing the magnetic disk. However, this is by no means limitative. For example, it is possible to provide projection 40 on front end 2d of magnetic head 2, as shown in FIG. 4. As a further alternative, stepped portion 4 may have or terminate in acutely inclined end surface 4b as shown in FIG. 5. Further, stepped portion 4c may terminate in arcuately concavely curved end surface 4c as shown in FIG. 6 to enhance the effect of taking dust 5 away. In general, any shape may be adopted so long as it permits dust 5 to be taken away.

As has been described in the foregoing, according to the invention the magnetic head is provided at the front end with respect to the surface of the magnetic disk with a laterally extending stepped portion. It is thus possible to provide a highly reliable magnetic recording apparatus, in which air stream entering the gape between the magnetic head and magnetic disk is rendered into a vortex flow to take dust away from the disk surface, thus extremely reducing dust entering the gap between the slider section of the head and the disk thus eliminating or reducing the head crush.

What is claimed is:

1. A magnetic recording apparatus comprising a magnetic disk rotated by drive means, a magnetic head having a front end, an upper and lower surface, the lower surface located over the magnetic disk, and a slider affixed to the lower surface of the magnetic head, said slider held floated and defining a gap relative to the disk, the gap created by an air stream generated with the rotation of said magnetic disk, said magnetic head being provided at the front end with a stepped portion extending laterally across substantially the entire front end thereof to promote dust removal from beneath the magnetic head.

2. The magnetic recording apparatus according to claim 1, wherein said stepped portion terminates in an end surface perpendicular to said magnetic disk.

3. The magnetic recording apparatus according to claim 1, wherein said stepped portion terminates in an acutely forwardly inclined end surface, said inclined end surface being at least as long as the gap.

4. The magnetic recording apparatus according to claim 1, wherein said stepped portion has or terminates in an arcuately concavely curved end surface, said end surface being of sufficient dimensions to form a vortex in the air stream.

5. The magnetic recording apparatus according to claim 1, wherein said stepped portion is formed by a projection extending from the front end of said magnetic head in a direction opposite to the direction of the generated air stream.

6. The magnetic recording apparatus according to claim 1, wherein said stepped portion has a height of several ten's of microns and a depth of several hundred microns.

7. The magnetic recording apparatus according to claim 1, wherein said stepped portion extends across the entire front end thereof.

8. The magnetic recording apparatus according to claim 1, wherein said stepped portion extends continuously lateral of said front end.

9. The magnetic recording apparatus according to claim 1, wherein said slider terminates short of the front end of the lower surface of said magnetic head to define at least in part said stepped portion.

10. A magnetic recording apparatus for recording/reproducing signals on a magnetic disk, comprising a magnetic head having a front end and an upper and lower surface, and means for supporting the lower surface of the magnetic head over the magnetic disk utilizing an air stream generated upon rotation of said magnetic disk, said magnetic head having a stepped recess extending laterally across substantially the entire front end thereof that provides vortex flow at the recess to remove dust from the disk.

11. A magnetic recording apparatus according to claim 10, wherein said stepped recess extends laterally across the front end of the magnetic head.

12. A magnetic recording apparatus according to claim 10, wherein said stepped recess has an end surface that is disposed perpendicular to the plane of said magnetic disk.

13. A magnetic recording apparatus according to claim 10, wherein said stepped recess has an acutely forwardly inclined end surface.

14. A magnetic recording apparatus according to claim 10, wherein said stepped recess has an arcuately concavely curved end surface.

15. A magnetic recording apparatus according to claim 10, wherein said stepped recess is formed by a projection extending from the front end of said magnetic head in a direction opposite to the direction of the generated air stream.

16. A magnetic recording apparatus according to claim 10, wherein said stepped recess has a height of several ten's of microns and a depth of several hundred microns.

17. A magnetic recording apparatus according to claim 10, wherein said stepped recess extends across the entire front end thereof.

18. A magnetic recording apparatus according to claim 10, wherein said stepped recess extends continuously lateral of said front end.

19. A magnetic recording apparatus according to claim 10, wherein said slider terminates short of the front end of the lower surface of said magnetic head to define at least in part said stepped recess.

* * * * *